Patented Dec. 1, 1936

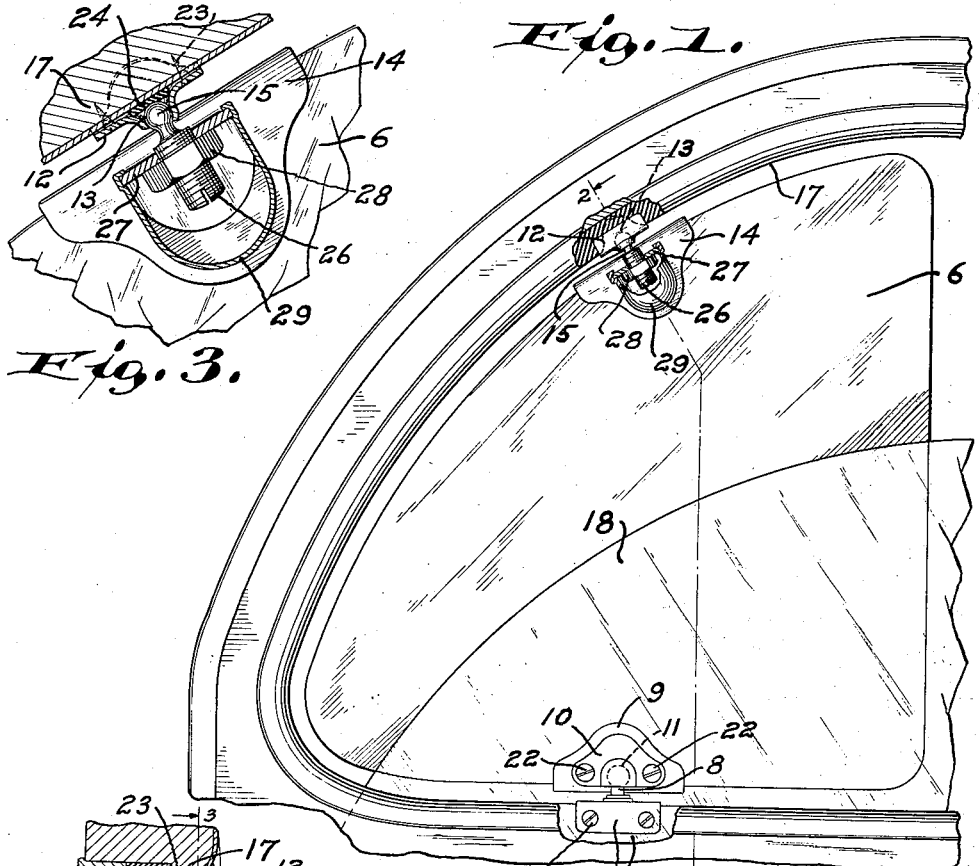

2,062,483

UNITED STATES PATENT OFFICE 2,062,483

VENTILATING WING

Joel R. Thorp, West Allis, Wis., assignor to The Fulton Company, West Allis, Wis., a corporation of Wisconsin Application May 20, 1935, Serial No. 22,295

3 Claims. (Cl. 296—84)

The present invention relates generally to improvements in the construction and operation of ventilating wings of the type which are associable with the side windows of automobiles or the like, and which are swingably adjustable to ventilate the interior of the vehicle enclosure without subjecting the occupants to undesirable draft.

The primary object of the present invention is to provide an improved ventilating wing which is simple in construction, and which is moreover highly effective in use.

While various types of ventilating side wings for automobiles, have heretofore been proposed, all of these prior devices are deficient in some respect. The modern odd shapes of window reveals resulting from the streamline design of these vehicles, has introduced difficulties in the construction and mode of attaching the wing supporting brackets, and the prior bracket structures which can be satisfactorily applied to such reveals, are undesirably complicated and costly. The prior simplified types which were suitable for attachment to the old style relatively rectangular window reveals, cannot be satisfactorily utilized with the modern car structures, and there is therefore great demand for a simple wing assemblage which is effectively cooperable with all kinds of window reveals.

It is an object of the present invention to provide an improved wing structure having supporting brackets which coact with the shield through universal pivots of extremely simple and durable construction, and which may be readily applied to the odd shaped reveals of streamlined automobiles as well as to those of the older types of cars.

Another specific object of the present invention is to provide a relatively low priced side wing assemblage which possesses all of the operating advantages of the more refined and complicated prior types of wing structures.

A further specific object of the invention is to provide a durable ventilating wing which can be rigidly attached to the window reveals so as to permit convenient angular adjustment of the deflector shield without subjecting the latter to undesirable stress.

Still another specific object of the invention is to provide a simplified wing assembly wherein the deflector shield may, if so desired, be swung bodily away from the main window glass, without necessitating removal of the shield supporting brackets.

An additional specific object of the present invention is to provide an improved side wing mounting comprising ball and socket pivots of simplified and extremely durable construction for permitting quick swinging of the deflector shield for draft regulating purposes, and which will effectively retain the shield in adjusted position.

These and other objects and advantages will be apparent from the following detailed description.

A clear conception of an embodiment of the present invention, and of the mode of constructing and of utilizing ventilating wing structures built in accordance with the improvement, may be had by referring to the drawing accompanying and forming a part of this specification wherein like reference characters designate the same or similar parts in the various views.

Fig. 1 is an inside elevation of the upper front portion of a side automobile door, showing one of the improved ventilating side wings attached thereto at the main window opening, the main window being shown in partially lowered position and portions of the structure having been broken away in order to expose normally concealed parts;

Fig. 2 is a transverse section through the side door and ventilating wing structures of Fig. 1, taken along the line 2—2, and showing the wing shield in dot-and-dash lines swung bodily away from the plane of the main window glass;

Fig. 3 is an enlarged fragmentary sectional view taken through the upper wing supporting structure, along the line 3—3 of Fig. 2; and Fig. 4 is a similarly enlarged fragmentary sectional view taken transversely and centrally through the lower wing supporting structure.

While the invention is shown and specifically described herein, as being applied to a swingably adjustable vehicle ventilating side wing of a particular type especially adapted for cooperation with a particular form of window reveal, it is not the intent to unnecessarily restrict the scope and utility of the improvement by such specific embodiment, since the improved wing structure is also cooperable with other forms and types of reveals.

Referring to the drawing, the improved ventilating side wing illustrated therein, comprises in general, a transparent air deflecting shield 6 of substantially triangular shape and preferably formed of relatively strong, plate or safety glass; a lower bracket 7 having an upwardly projecting bearing ball 8 secured thereto; a lower supporting element 9 attached to a lower edge portion of the shield 6 and having a member 10 associated therewith to provide a downwardly open socket 11 coacting with the ball 8 to provide a lower pivotal connection; an upper bracket 12 having a downwardly open socket 13; an upper supporting element 14 secured to an upper edge portion of the shield 6 adjacent to the bracket 12; and a bearing ball 15 carried by the upper element 14 and cooperating with the socket 13 to provide an upper pivotal connection.

The improved wing specifically shown, is especially adapted for cooperation with a main window having oppositely disposed lower and upper reveal portions 16, 17 respectively, and provided with a substantially vertically slidable main window glass 18. The lower bracket 7 is preferably formed of sheet metal and is shaped to snugly engage the upper and inner surfaces of the lower reveal portion 16, this bracket being rigidly but detachably attachable to the reveal either by means of substantially horizontal screws 19, or by vertical screws 20, or by both, as indicated in Fig. 4. The bearing ball 8 which is preferably formed of solid stock, may be rigidly attached to the bracket 8 by riveting as shown, or by welding, and may even be formed integral with the lower bracket; and this ball 8 is preferably disposed between the planes of the main window glass 18 and of the shield 6, and nearer the plane of the shield 6. The lower supporting element 9 is also formed of sheet metal, and a layer 21 of resilient material such as rubber, may be interposed between the element 9 and the lower edge portion of the shield 6, as shown, in order to avoid undesirable stress on the glass. The socket forming member 10 may also be formed of sheet metal, and is attached to the supporting element 9 by screws 22, and the member 10 and element 9 which form the socket 11, frictionally engage the sphere or ball 8 in such manner that the shield 6 may be universally pivotally swung or adjusted, but cannot be lifted away from the ball 8 without releasing the screws 22.

The upper bracket 12 is likewise preferably formed of sheet metal and is shaped to snugly engage the lower and inner surfaces of the upper forwardly inclined upper reveal portion 17, this bracket being likewise rigidly but detachably attachable to the adjacent reveal by screws 23, as shown in Figs. 2 and 3, and the socket thereof being located between the planes of the window glass 18 and of the shield 6, and preferably nearer the latter. Disposed within the downwardly open socket 13 formed by the bracket 12, is a resilient pad 24 formed of rubber or the like, with which the ball 15 normally coacts, and the lower opening of the socket 13 is of such size that it snugly embraces the ball while permitting downward withdrawal of the latter therethrough. The upper supporting element 14 may likewise be formed of sheet metal, and a layer 25 of resilient material such as rubber, may also be interposed between this element and the upper edge portion of the shield 6 as shown in Fig. 2, in order to protect the glass shield against undesirable stress. The upper bearing ball 15 has a threaded shank 26 which is adjustably associated with an integral inwardly extending flange 27 of the element 12, and which is adapted to be locked in adjusted position by means of a lock nut 28 coacting with the shank 26 and flange 27. For purposes of neatness in appearance, the nut 28 and the lower end of the shank 26, may be inclosed by a sheet metal cap 29 having snap frictional engagement with the edge of the flange 27, but this cap may be omitted if so desired.

When the various parts of the improved ventilating wing structure have been properly constructed and initially assembled, the device may be conveniently applied as an accessory to the reveals 16, 17 of most standard automobiles, by merely lowering the main window glass 18, and attaching the lower and upper brackets 7, 12 in proper position upon the lower and upper reveal portions 16, 17, respectively, with the aid of fastening screws as shown. The shield 6 being permanently but adjustably associated with the lower bracket 7, must necessarily be applied to the lower reveal portion 16 with the bracket 7, but the upper bracket 12 may be attached to its reveal portion 17 independently of the deflector shield 6. When the brackets 7, 12 have been securely attached to the reveal portions, the upper bearing ball 15 may be adjusted to position the same within the socket 13 of the bracket 12, and in frictional engagement with the resilient pad 24, whereupon the lock nut 28 may be adjusted to clamp the threaded shank 26 in adjusted position within the flange 27. By virtue of the universal pivotal connections afforded by the balls 8, 15 coacting with the sockets 11, 13 respectively, the deflector shield 6 may then be angularly adjusted about a substantially upright pivotal axis, without undesirably stressing the glass shield, and will be held in various positions of adjustment by friction. The pivotal axis of the shield 6, is located between the planes of the shield 6 and of the main window glass 18, thereby permitting angular adjustment of the deflector shield throughout a considerable angle, without interfering with the main window glass. The degree of friction induced by the pivotal bearings, may be readily varied by adjustment of the shank 26 of the upper bearing ball 15, and also by adjustment of the screws 22 which fasten the member 10 to the lower supporting element 9.

While the lock nut 28 and manipulating portion of the shank 26, are ordinarily concealed by the cap 29, this cap may be conveniently removed so as to permit adjustment of the upper ball 15. If it should become desirable to obtain free access to the outer surface of the main window glass 18, the upper bearing ball 15 may be completely withdrawn from the socket 13 of the bracket 12, and the shield 6 may thereafter be swung outwardly to the position shown in dot-and-dash lines in Fig. 2. The lower socket 11 will permit considerable outward swinging of the shield, and the lower portion of the bearing sphere 18 will act as a stop for limiting the outward swinging movement of the deflector shield when the upper end thereof has been thus released.

From the foregoing detailed description, it will be apparent that the present invention provides an improved ventilating wing assemblage which can be manufactured and sold at extremely moderate cost, and which can moreover be readily and firmly attached to window frames having odd shaped reveals disposed at a considerable angle relative to each other. Most of the parts may be readily manufactured from sheet metal with the aid of punches and dies, and the bearing ball elements can be constructed from rod stock with the aid of screw machines. Application of the improved wing assemblage to a window frame, may be effected solely with the aid of an ordinary screw driver, and removal may be just as readily effected. The improved structure is not only extremely durable and simple, but is also devoid of objectionable rattling, and prevents subjecting the transparent deflector shield 6 to undesirable stresses of any kind. The improved ventilating wing presents an extremely neat and finished appearance, and can obviously be attached to an automobile window or the like, without undesirably marring the finish of the car. As a ventilator, the device has proven highly effective in actual use, and does not in any manner interfere with normal adjustment of the main window glass 18.

It should be understood that it is not desired to limit the present invention to the exact details of construction and to the precise mode of applying and of utilizing the device herein shown and described, for various modifications within the scope of the claims may occur to persons skilled in the art.

It is claimed and desired to secure by Letters Patent:—

1. In combination with a main window having oppositely disposed reveal portions, a substantially triangular deflector shield, a bracket secured to the lower of said reveal portions and having a bearing ball projecting upwardly therefrom, a socket carried by the lower substantially horizontal edge of said shield and frictionally engaging said ball, another bracket secured to the other of said reveal portions and having a socket therein, another bearing ball associated with the upper inclined edge of said shield and frictionally engaging said bracket socket, one of said bearing balls being adjustable relative to its receiving socket, and means for locking said adjustable ball in various positions of adjustment.

2. In combination with a main window having oppositely disposed relatively inclined reveal portions, a substantially triangular deflector shield, a bracket secured to the lower of said reveal portions and having a lower bearing ball projecting upwardly therefrom, a socket carried by the lower substantially horizontal edge of said shield and frictionally engaging said ball, another bracket secured to the other of said reveal portions and having a socket therein, an upper bearing ball associated with the upper inclined edge of said shield and frictionally engaging said bracket socket, said upper bearing ball being adjustable relative to its receiving socket so as to simultaneously vary the friction at both sockets, and means for locking said adjustable ball in various positions of adjustment.

3. In combination with a main window having oppositely disposed relatively inclined reveal portions, a substantially triangular deflector shield, a bracket secured to the lower of said reveal portions and having a lower bearing ball projecting upwardly therefrom, a socket carried by the lower substantially horizontal edge of said shield and frictionally engaging said ball, another bracket secured to the other of said reveal portions and having a socket therein, an upper bearing ball associated with the upper inclined edge of said shield and frictionally engaging said bracket socket, said upper bearing ball being adjustable relative to its receiving socket so as to simultaneously vary the friction at both sockets, means for locking said adjustable ball in various positions of adjustment, and a removable closure cap normally concealing said locking means.

JOEL R. THORP.